United States Patent
Polazzi et al.

(10) Patent No.: US 6,470,651 B1
(45) Date of Patent: Oct. 29, 2002

(54) METHOD AND DEVICE FOR FEEDING GROUPS OF CIGARETTES TO A CONTINUOUS WRAPPING LINE OF A PACKING MACHINE

(75) Inventors: Alberto Polazzi, Rastignano (IT); Mario Spatafora, Bologna (IT)

(73) Assignee: G.D Societa' per Azioni, Pomponia (IT)

( * ) Notice: Subject to any disclaimer, the term of this patent is extended or adjusted under 35 U.S.C. 154(b) by 0 days.

(21) Appl. No.: 09/563,789

(22) Filed: May 2, 2000

(30) Foreign Application Priority Data

May 3, 1999 (IT) .......................... BO99A0208

(51) Int. Cl.[7] .............................................. B65B 11/00
(52) U.S. Cl. .............................. 53/466; 53/234; 53/251; 53/252; 493/910
(58) Field of Search .......................... 53/466, 228–234, 53/444, 148, 149, 150, 209, 251, 252; 493/910, 911

(56) References Cited

U.S. PATENT DOCUMENTS

| 3,805,477 A | * | 4/1974 | Kruse et al. | .................. 53/32 |
|---|---|---|---|---|
| 4,476,665 A | * | 10/1984 | Oberdorf | ..................... 53/575 |
| 4,559,757 A | * | 12/1985 | Focke et al. | ................... 53/176 |
| 4,823,536 A | * | 4/1989 | Manservigi et al. | ........... 53/466 |
| 5,727,360 A | * | 3/1998 | Focke | ........................ 53/387.2 |
| 6,023,909 A | * | 2/2000 | Boldrini | ..................... 53/234 |

FOREIGN PATENT DOCUMENTS

| EP | 0 078 066 A | 5/1983 |
|---|---|---|
| GB | 1 570 605 A | 7/1980 |

* cited by examiner

*Primary Examiner*—Rinaldi I. Rada
*Assistant Examiner*—Thanh Truong
(74) *Attorney, Agent, or Firm*—Marshall, Gerstein & Borun.

(57) ABSTRACT

On a continuously operating cigarette packing machine, a group of cigarettes is transferred from a pocket—integral with an endless conveyor having at least one substantially straight portion—to a first seat—carried on an input wheel of a wrapping line and movable with respect to the input wheel—by transferring the group axially from the pocket to a second seat, which is fed by an intermediate wheel along a portion of the endless conveyor and is movable with respect to the intermediate wheel; and by then orienting the first and second seats with respect to the respective wheels so that one of the first and second seats penetrates the other for a given time.

33 Claims, 5 Drawing Sheets

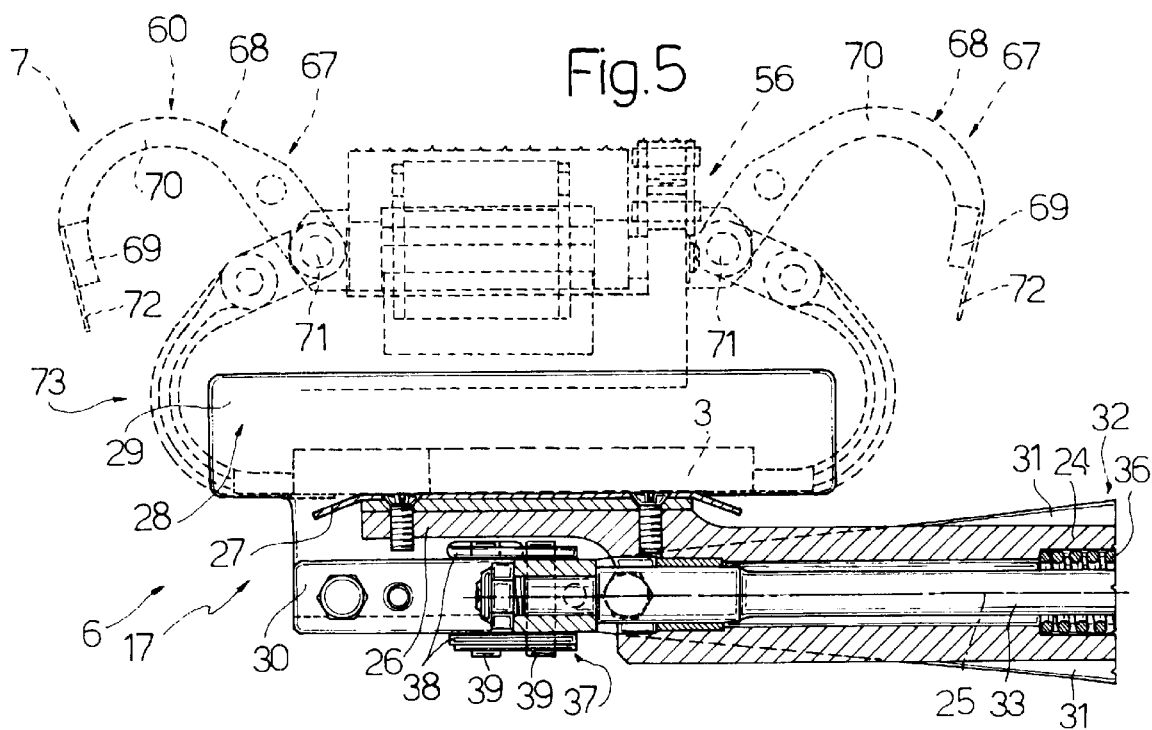

METHOD AND DEVICE FOR FEEDING GROUPS OF CIGARETTES TO A CONTINUOUS WRAPPING LINE OF A PACKING MACHINE

The present invention relates to a method of feeding groups of cigarettes to a continuous wrapping line of a packing machine.

BACKGROUND OF THE INVENTION

In the tobacco industry, a packing machine is employed comprising an endless conveyor belt fitted integrally with equally spaced, substantially U-shaped pockets, each for housing a respective group of cigarettes arranged in a number of layers and fed in known manner into the respective pockets through the outlets of a loading hopper associated with the belt.

Once formed, each group is normally transferred from the respective pocket on the belt to a respective seat on a first wheel of a wrapping line, along which, each group is applied with a respective inner sheet of wrapping material—normally foil—which is folded about the group to form an inner wrapping, and with an outer sheet of wrapping material, which is folded about the group to form an outer wrapping. When the outer sheet comprises a semirigid blank, the inner sheet is applied with a respective collar prior to the respective blank.

Transferring the group from the respective pocket on the belt to a respective seat on the first wheel of the wrapping line normally poses no problems when both the pocket and the corresponding seat are moved in steps through a transfer station for transferring the group from the pocket to the seat. On the other hand, considerable difficulty is encountered when both the belt and the wrapping line are operated continuously. In which case, in fact, for the groups to be transferred correctly from the belt to the wrapping line, each pocket and corresponding seat should, theoretically, be maintained in a given position with respect to each other throughout the transfer operation.

This would best be achieved using pockets and seats capable of being oriented with respect to the belt and first wheel respectively. Whereas, however, devising a seat movable with respect to a wheel is a fairly straightforward matter, it is not quite so easy to device a pocket movable with respect to a belt. What is more, the pockets of a continuously operating belt are difficult to combine with push devices for expelling the respective groups of cigarettes from the pockets.

SUMMARY OF THE INVENTION

It is an object of the present invention to provide a method of feeding groups of cigarettes to a continuous wrapping line of a packing machine, designed to eliminate the aforementioned drawbacks.

According to the present invention, there is provided a method of feeding a group of cigarettes to a wrapping line of a cigarette packing machine; the wrapping line being operated continuously; the method comprising a transfer step to transfer said group from a pocket on a conveyor to a first seat carried by an input wheel of said wrapping line and movable with respect to the input wheel; the pocket being integral with said conveyor and being fed continuously by the conveyor along a given endless path; said input wheel rotating about a respective first axis to feed said first seat continuously through an input station of said wrapping line; and the method being characterized in that said transfer step is performed by axially transferring the group from the pocket to a second seat, which is carried by an intermediate wheel, is movable with respect to the intermediate wheel, and is fed continuously by the intermediate wheel along a portion of said path in time with said pocket; and by then orienting at least one of said first and second seats with respect to the respective wheel, so that one of said first and second seats penetrates the other for a given time at said input station.

The present invention also relates to a device for feeding groups of cigarettes to a continuous wrapping line of a packing machine.

According to the present invention, there is provided a device for feeding a group of cigarettes to a wrapping line of a packing machine; the wrapping line comprising an input station; the device comprising a conveyor moving continuously along a given endless path and which has at least one pocket integral with the conveyor; and an input wheel of said wrapping line, the input wheel having a first axis, being fitted with at least one first seat, and rotating continuously about said first axis to feed the first seat through said input station; and the device being characterized by also comprising an intermediate wheel, which has a second axis parallel to said first axis, rotates continuously about said second axis, and is fitted with at least one second seat movable with the intermediate wheel along a portion of said path in time with said pocket; and transfer means for axially transferring said group of cigarettes from said pocket to said second seat; at least one of said first and second seats being movable with respect to the respective wheel so that one of said first and second seats penetrates the other for a given time at said input station.

BRIEF DESCRIPTION OF THE DRAWINGS

A non-limiting embodiment of the present invention will be described by way of example with reference to the accompanying drawings, in which:

FIG. 5 shows a side view, with parts in section and parts removed for clarity, of a third detail in FIG. 1.

DETAILED DESCRIPTION OF THE INVENTION

Figure 1:
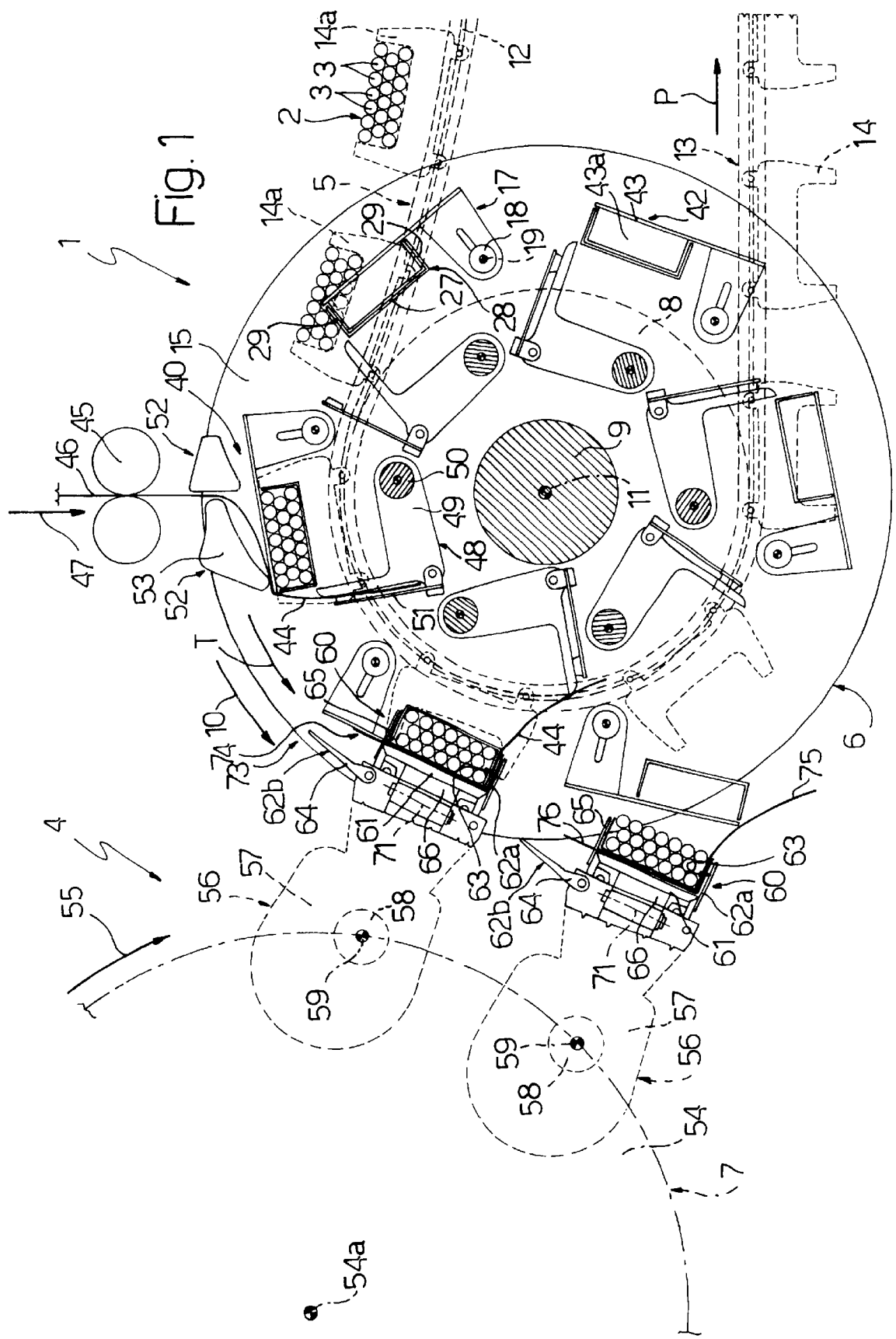
FIG. 1 shows a schematic section, with parts removed for clarity, of a preferred embodiment of the device according to the present invention.

Number 1 in FIG. 1 indicates as a whole a device for feeding groups 2 of cigarettes 3 to a continuous wrapping line 4 of a cigarette packing machine. Each group 2 is defined by a number of superimposed layers of cigarettes 3, and is substantially parallelepipedal with a substantially rectangular section.

Device 1 comprises a pocket conveyor 5 for feeding groups 2 successively to an intermediate wheel 6, which successively transfers groups 2 to an input wheel 7 of wrapping line 4.

As shown in FIG. 1, conveyor 5 comprises a sprocket 8 fitted to a powered shaft 9 to rotate continuously, in an anticlockwise direction 10 in FIG. 1, about a respective axis 11 perpendicular to the FIG. 1 plane. Conveyor 5 also comprises a conveyor belt 12, which extends along an endless path P defined by a guide 13, and in turn comprises a number of U-shaped pockets 14 equally spaced along belt 12, each for receiving a respective group 2, and which are fed by belt 12 along path P. Each pocket 14 is fitted integrally to belt 12 by a connecting block 14a for maintaining pocket 14 oriented the same way at all times with respect to belt 12. In other words, pockets 14 are entirely passive and substantially incapable of any active movement with respect to belt 12.

Intermediate wheel 6 comprises two drums 15, 16 fitted to shaft 9 and located on opposite sides of sprocket 8.

Figure 2:
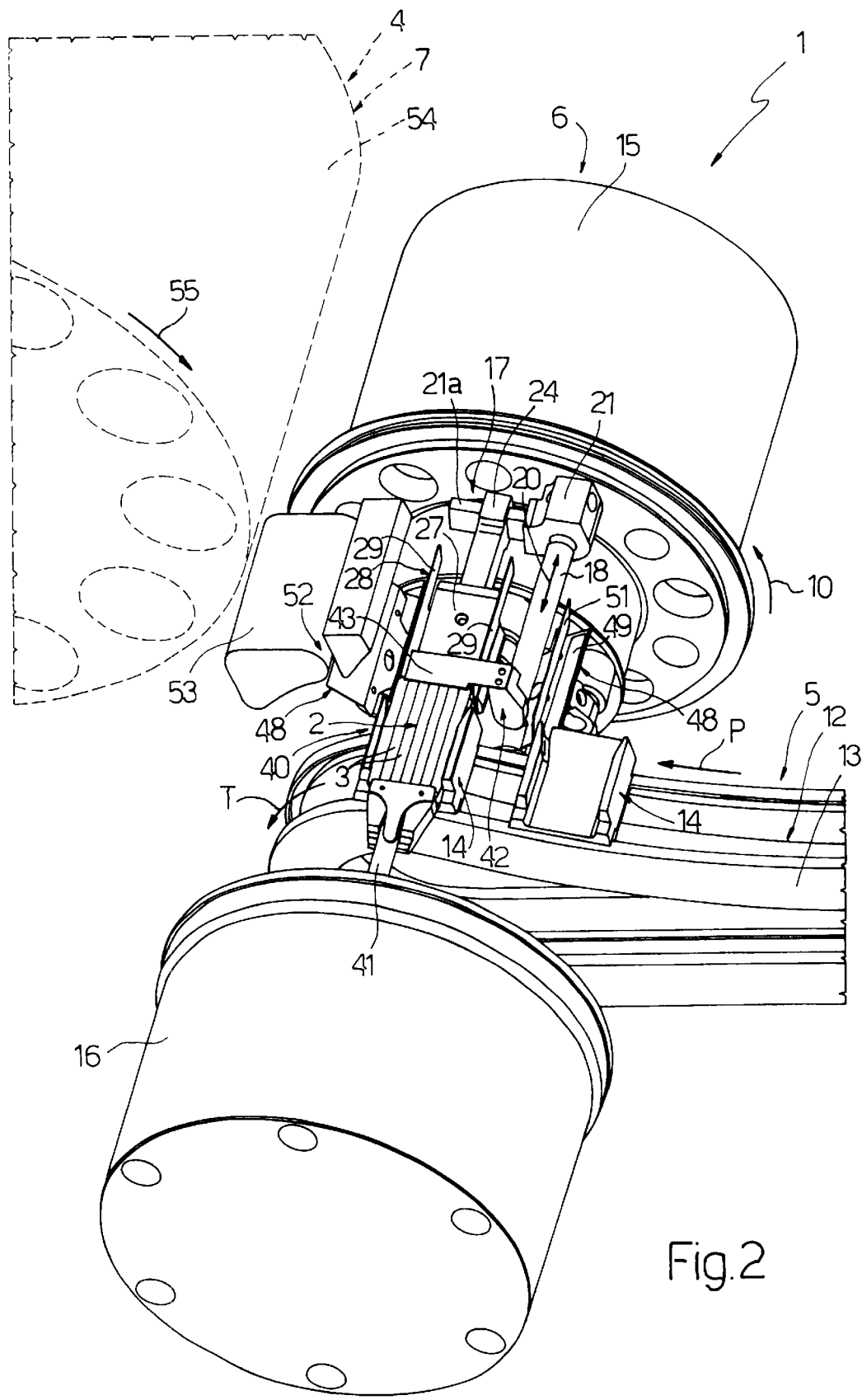
FIGS. 2 and 3 show larger-scale views in perspective of a first detail in FIG. 1.
Figure 3:
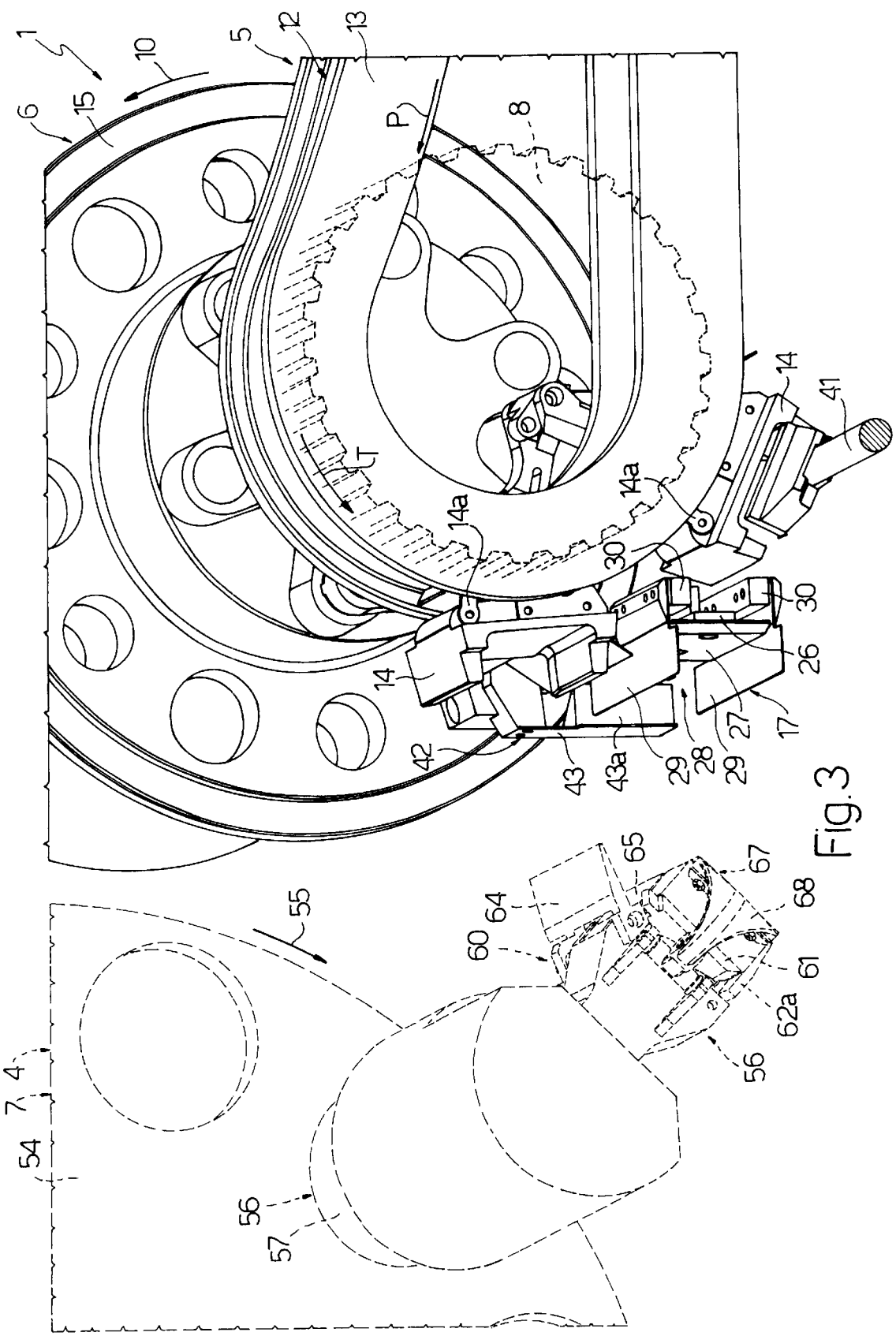
Figure 4:
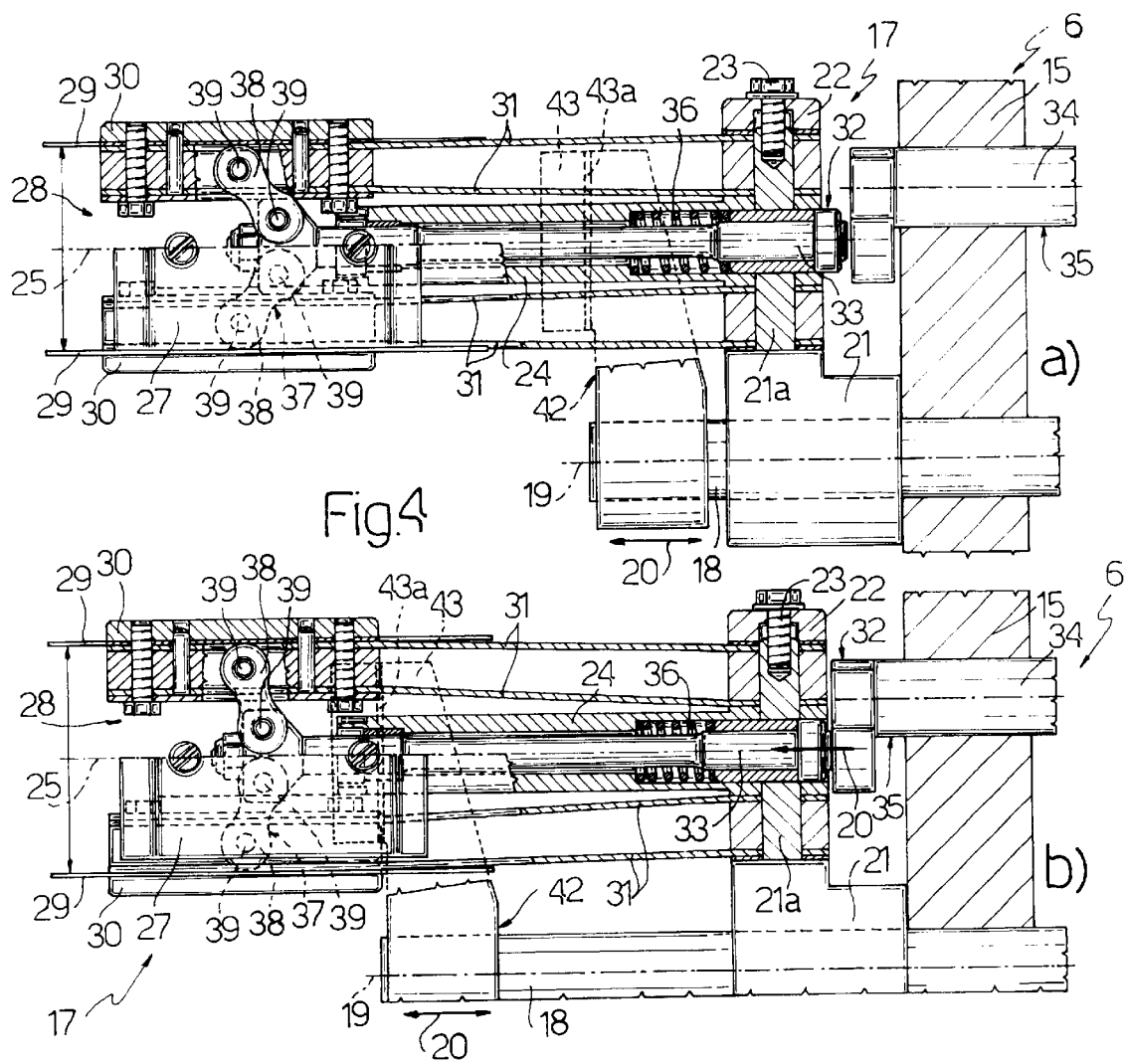
FIG. 4 shows an axial section of a second detail in FIG. 1 in two different operating positions.

As shown more clearly in FIGS. 2, 3 and 4, drum 15 comprises a number of transfer units 17 equally spaced along the periphery of drum 15 and each comprising a shaft 18, which is connected in rotary manner to drum 15 and oscillated about a respective axis 19 parallel to axis 11 by a known cam actuating device (not shown) housed inside drum 15. Each shaft 18 is also connected to drum 15 in axially-sliding manner, and is movable—in a direction 20 parallel to axis 19, and by a known actuating device (not shown) also housed inside drum 15—between an extracted position (FIG. 2) and a withdrawn position (FIG. 4a) via an intermediate position (FIG. 4b).

As shown more clearly in FIG. 4, each shaft 18 extends in axially-sliding, angularly-fixed manner through a sleeve 21 coaxial with axis 19 and anchored axially to drum 15 by a known lock device (not shown). An arm 21a projects radially from sleeve 21 and engages a cavity formed in a plate 22 locked to respective arm 21a and against sleeve 21 by a screw 23. A tubular body 24 is locked through plate 22 and arm 21a, extends parallel to shaft 18, has an axis 25 substantially parallel to axis 19 and crosswise to path P, and is fitted integrally at the free end with a substantially flat plate 26 (FIG. 5) parallel to axis 25. Plate 26 is fitted with a bottom wall 27 of a substantially U-shaped seat 28, which, being allowed to oscillate with respective shaft 18 about axis 19, is orientable with respect to drum 15.

Seat 28 also comprises two lateral walls 29, which are defined by two relatively thin plates, extend crosswise to direction 10, and are located one at the front and the other at the rear of wall 27 in direction 10.

Walls 29 are connected integrally to respective plates 30 located on opposite sides of tubular body 24, and which extend parallel to axis 25 and are connected to plate 22 by respective leaf springs 31 so as to move with respect to each other—in a direction crosswise to axis 25 and by means of an actuating device 32—between a closed position (FIG. 4a) and an open position (FIG. 4b).

Actuating device 32 comprises a rod 33 which, by means of an output pushrod 34 of a known cam control device 35 housed inside drum 15, slides axially along tubular body 24, in opposition to a coil spring 36 and leaf springs 31, between a withdrawn position (FIG. 4a) and an extracted position (FIG. 4b).

The end of rod 33 projecting from tubular body 24 and located between the two plates 30 is fitted with a double crank mechanism 37 comprising two pairs of connecting rods 38 and forming part of device 32. The connecting rods 38 in each pair are hinged by means of respective pins 39 to rod 33 at one end and to respective plate 30 at the other. Since leaf springs 31 prevent the two plates 30 from moving parallel to axis 25, each axial position of rod 33 corresponds to a given position of the connecting rods 38 in each pair with respect to the connecting rods 38 in the other pair, and therefore to a given distance between the two walls 29. More specifically, when rod 33 is in the withdrawn position, the distance between walls 29 is approximately equal to but no greater than the width of a group 2 inside respective pocket 14; and, when rod 33 is in the extracted position, the distance between walls 29 is approximately equal to but no less than the width of a group 2 inside respective pocket 14, so that, when rod 33 switches from the extracted to the withdrawn position, device 32 provides for compacting group 2 housed in seat 28 between walls 29.

Each unit 17 is fed to a transfer station 40 in time with a respective pocket 14 on conveyor 5, so that, as both travel through station 40, the combined action of a pusher 41 carried by drum 16 and a counterpusher 42 carried by drum 15 transfers respective group 2 of cigarettes 3 axially from pocket 14 on conveyor 5 to seat 28 on intermediate wheel 6. Counterpusher 42 comprises an elongated plate 43 lying in a plane parallel to bottom wall 27 of seat 28 and extending crosswise to axis 19. Plate 43 is integral with the free end of shaft 18, and is fitted with a pad 43a integral with the surface of plate 43 facing shaft 18 and of substantially the same shape, in direction 20, as seat 28. One edge of plate 43 projects beyond pad 43a towards drum 16 to retain cigarettes 3 in group 2 radially when pad 43a engages respective seat 28 and is positioned contacting the ends of cigarettes 3 in respective group 2.

At transfer station 40, group 2 is applied with an inner sheet 44 of wrapping material fed to station 40 by a known supply device 45, which, in known manner, forms a succession of sheets 44 from a continuous strip 46 and feeds sheets 44 successively to station 40 in time with respective groups 2 and in a direction 47 substantially crosswise to path P. For this purpose, unit 17 is provided with a gripping member 48 substantially in the form of a gripper for retaining a front portion of a respective sheet 44, and which comprises a first jaw 49 fitted to a shaft 50 extending, parallel to axis 19, through drum 15 and oscillated, with respect to drum 15 and about a respective axis, by a known cam actuating device (not shown) housed inside drum 15. Gripping member 48 also comprises a second jaw 51 hinged to jaw 49, and which is oscillated to and from a closed position by a known cam actuating device (not shown) housed inside drum 15.

Transfer station 40 is also provided with a guide 52 for guiding strip 46, and which comprises two fixed members located on opposite sides of strip 46. The member downstream from strip 46 in direction 10 defines a fixed folding device 53, which is so formed as to be tangent to seats 28 traveling successively through station 40, and to fold respective sheets 44 into an L about respective groups 2 as explained in more detail later on.

Input wheel 7 comprises a drum 54 fitted to a powered shaft (not shown) to rotate continuously, in an opposite direction 55 to direction 10, about an axis 54a parallel to axis 11.

Drum 54 is fitted with a number of conveying and wrapping units 56, which are equally spaced along the periphery of drum 54, extend radially outwards, and are fed by wheel 7 in direction 55.

Each unit 56 comprises a frame 57, which extends radially outwards from the periphery of drum 54 and is fitted at the inner end to a shaft 58 mounted for rotation through drum 54 and oscillated, with respect to drum 54 and by a known cam actuating device (not shown) housed inside drum 54, about an axis 59 parallel to axis 54a.

Each unit 56 also comprises a variable-shape seat 60 fitted to the free end of respective frame 57 and having a concavity facing radially outwards.

Each seat 60 comprises a bottom wall 61 and two lateral walls 62 crosswise to direction 55. More specifically, one of walls 62 is located to the front of wall 61 in direction 55, and is hereinafter indicated 62a; while the other is located to the rear of wall 61 in direction 55, and is hereinafter indicated 62b.

Walls 62 of each seat 60 are movable between a closed position wherein walls 62 are substantially perpendicular to respective wall 61, and a flared position wherein walls 62 diverge with respect to each other. In the closed position, walls 62 define a cavity 63 of substantially the same width as seats 28 measured with respective walls 29 in the closed position.

Wall 62a is hinged to the free end of frame 57, and is rotated, with respect to frame 57 and by a known actuating device (not shown), between said closed and flared positions about an axis parallel to axis 59. Wall 62a is formed in one piece of a length, measured parallel to axis 59, substantially equal to the length of a respective group 2. Each wall 62b, on the other hand, comprises two portions 64 and 65; portion 64 being located to the rear of portion 65 in direction 55, and being of a length, measured parallel to axis 59, substantially equal to the length of a respective group 2 and greater than the length of portion 65.

The two portions 64 and 65 are hinged to the free end of respective frame 57 to rotate independently of each other between said closed and flared positions and about respective axes parallel to axis 59.

Wall 61 extends parallel to axis 59, is of a size substantially equal to the length and width of a respective group 2, and is fitted to a shaft 66, the axis of which is perpendicular to axis 59. Shaft 66 is connected in axially-sliding manner to frame 57, and is movable, by a known actuating device (not shown), between a withdrawn position and an extracted position wherein respective wall 61 is located outside cavity 63.

Each unit 56 comprises a gripping device 67, which cooperates with walls 61 and 62 of respective seat 60 to retain respective group 2 inside seat 60.

Gripping device 67 comprises two jaws 68 located on opposite sides of shaft 66 in a direction parallel to axis 59, and each comprising a gripping head 69, and a curved rod 70, which is hinged to the free end of respective frame 57 and is oscillated—with respect to frame 57, by a known actuating device (not shown), and about an axis 71 crosswise to axis 59 and substantially parallel to direction 55—to and from a position gripping the end of a respective group 2 against wall 61 in the withdrawn position between walls 62.

Each head 69 has a longitudinal edge 72, which extends substantially parallel to respective axis 71, is of a width, measured parallel to axis 71, substantially equal to the width of a group 2, and has an inner underside recess defining a substantially L-shaped cross section.

Operation of device 1 will now be described with reference to the supply of one group 2 of cigarettes 3 to wrapping line 4.

Conveyor 5 feeds group 2 to transfer station 40 in time with a seat 28 and a gripping member 48 on intermediate wheel 6. More specifically, on reaching station 40, seat 28 is perfectly coaxial with respective pocket 14, with lateral walls 29 in the open position, and with counterpusher 42 in the extracted position; while gripping member 48 is fed to station 40 with jaws 49 and 51 in an open position.

At station 40, the combined action of pusher 41 and counterpusher 42 transfers group 2 axially from pocket 14 on conveyor 5 to seat 28 on intermediate wheel 6. Once the group is transferred, counterpusher 42 is moved into the intermediate position (FIG. 4b), and lateral walls 29 into the closed position to compact cigarettes 3 inside seat 28. At the same time, jaws 49 and 51 of gripping member 48 are first maintained in the open position to receive a front portion of inner sheet 44 of wrapping material, and are then moved into the closed position to grip sheet 44, which is fed to station 40 by supply device 45 in time with member 48. Gripping member 48 is then rotated about the axis of respective shaft 50 to position sheet 44 correctly in front of respective seat 28.

Once gripped by gripping member 48, sheet 44 extends radially outwards from gripping member 48, and projects outwards of respective seat 28 so as to interfere with folding device 53, which engages the portion of sheet 44 projecting from seat 28, and folds the portion substantially 900 onto the outside of seat 28 so that sheet 44 assumes a substantially L shape.

Seat 28 is then fed through an input station 73 of wrapping line 4 in time with a seat 60 on input wheel 7, to enable group 2 and inner sheet 44 of wrapping material to be transferred from seat 28 to seat 60 at input station 73.

For which purpose, input wheel 7 feeds each unit 56 to station 73 so that respective seat 60 reaches station 73 with bottom wall 61 in the extracted position, with lateral walls 62 in the flared position, and with a collar 74 resting on bottom wall 61 in a flat initial configuration. Collar 74 is fed in known manner into seat 60 at a supply station (not shown) upstream from station 73.

At station 73, both seats 28 and 60—or at least one of seats 28 and 60—are oriented about respective axes 19 and 59 so that respective bottom walls 27 and 61 are maintained substantially parallel to each other for a given time, during which, group 2 is transferred from seat 28 to seat 60 in a succession of operations described in detail below.

To begin with, group 2, still housed inside seat 28 with respective walls 29 in the closed position, is brought into contact with wall 61 (with said collar 74 and inner sheet 44 of wrapping material in between) to enable counterpusher 42 to move into the withdrawn position, and member 48 to move jaws 49 and 51 into the open position and so release sheet 44. At this point, wall 61 is moved gradually into the withdrawn position so that seat 28 gradually penetrates seat 60.

As stated, inner sheet 44 of wrapping material is fed to seat 28 at transfer station 40. In a variation not shown, however, sheet 44 is fed directly to seat 60 at station 73 and in a direction substantially tangent to input wheel 7, and is placed in a flat initial configuration on top of collar 74 on bottom wall 61 of seat 60.

Upon wall 61 moving into the withdrawn position, and since the length of the supporting surface of wall 27 is less than the length of group 2, as shown clearly in FIG. 5, jaws 68 of respective gripping device 67 may be moved into the gripping position, and cooperate with wall 61 and with walls 29 to retain group 2 firmly inside seat 60.

At this point, walls 29 are moved by actuating device 32 into the open position, and seat 28 is extracted gradually from seat 60, with walls 27 and 61 still maintained parallel to each other. At the same time, wall 62a and portion 65 of wall 62b are moved gradually into the closed position to retain group 2 firmly inside seat 60, while portion 64 of wall 62b is still maintained in the flared position.

Wall 62a, on moving into the closed position, engages and folds sheet 44 and collar 74 simultaneously into respective L-shaped configurations about group 2; whereas portion 64, on account of its length and position, only engages sheet 44 on moving into the closed position, and, in conjunction with the action of wall 62a, folds sheet 4 into a U-shaped configuration in which sheet 44 is housed entirely inside seat 60 with the exception of a portion 75 projecting radially outwards of seat 60; and a tab 76 of collar 74, at this point, therefore projects outwards of seat 60 and parallel to direction 55.

Finally, at successive folding stations (not shown), first portion 75 and then tab 76 are folded about group 2 to fold sheet 44 and collar 74 into a tubular and a U-shaped configuration respectively about group 2.

In a variation shown in FIG. 2, sprocket 8 engages belt 12 at a portion (not shown) of path P, and belt 12 is looped about guide 13, which, at intermediate wheel 6, comprises a substantially circular portion T extending about and coaxially with axis 11. In this case, drums 15 and 16 are fitted in rotary manner to a frame (not shown) and connected to each other by an electrical axis.

What is claimed is:

1. A method of feeding a group of cigarettes to a wrapping line operated continuously of a cigarette packing machine, the method comprising a transfer step to transfer the group (2) from a pocket (14) integral with a conveyor (5) to a first seat (60) carried by an input wheel (7) of the wrapping line (4) and movable with respect to the input wheel (7), said transfer step comprising:

continuously feeding said group (2) along a given endless path (P) by means of the pocket (14) carried by the conveyor (5);

continuously feeding a second seat (28) carried by an intermediate wheel (6) along a portion of said path (P) in time with said pocket (14), the second seat (28) being movable with respect to the intermediate wheel (6);

axially transferring the group (2) from the pocket (14) to the second seat (28);

feeding the first seat (60) through an input station (73) of said wrapping line (4) by continuously rotating the input wheel (7) about a respective first axis (54a);

feeding the second seat (28) through the input station (73) in time with the first seat (60) by rotating the intermediate wheel (6) about a respective second axis (11) parallel to the first axis (54a);

orienting at least one of the first and second seats (60, 28) with respect to the respective wheel (7, 6), so that one of the first and second seats (60, 28) penetrates the other for a given time at the input station (73); and transferring the group (2) from the second seat (28) to the first seat (60) when one of the first and second seats (60, 28) penetrates the other at the input station (73).

2. The method of claim 1 wherein said conveyor (5) comprises a flexible member (12) extending along said path (P), which comprises a substantially circular portion (T) extending about said second axis (11), said intermediate wheel (6) being rotated about said second axis (11) at an angular speed equal to that of said flexible member (12) along said circular portion (T), and being substantially tangent to said input wheel (7) at said input station (73).

3. The method of claim 2 comprising a further step of applying an inner sheet of wrapping material (44) to the group (2) upstream from the input station (73), said inner sheet of wrapping material (44) being applied to the second seat (28) upstream from the input station (73).

4. The method of claim 3 wherein said inner sheet of wrapping material (44) is applied to said second seat (28) by gripping the inner sheet of wrapping material (44) by means of a gripping member (48) associated with said second seat (28).

5. The method of claim 4 wherein said gripping member (48) is moved with respect to said second seat (28) and with respect to said intermediate wheel (6) to position said inner sheet of wrapping material (44) correctly with respect to said second seat (28).

6. The method of claim 5 further comprising folding the inner sheet of wrapping material (44) upstream from said input station (73) in order to impart to the inner sheet of wrapping material (44) an L-shaped configuration about said second seat (28).

7. The method of claim 1 further comprising supplying a collar (74) to the first seat (60) upstream from the input station (73), in order to apply the collar (74) to the group (2) when the group is transferred from the second seat (28) to the first seat (60).

8. The method of claim 1 comprising a further step of compacting the cigarettes (3) in said group (2), said compacting step being performed during axial transfer of the group (2) from said pocket (14) to said second seat (28).

9. The method of claim 1 wherein said second seat (28) comprises a bottom wall (27) and two lateral walls (29) crosswise to a traveling direction (10) of the intermediate wheel (6) to house a said group (2) with the respective cigarettes (3) crosswise to said traveling direction (10), and in that said pocket (14) has a given width measured parallel to said path (P); and said lateral walls (29) being moved between an open position, in which said lateral walls (29) are separated by a distance approximately equal to but no less than said given width, and a closed position, in which said distance is approximately equal to but no greater than said given width.

10. The method of claim 9 comprising a further step of compacting the cigarettes (3) in said group (2), said compacting step being performed by moving said lateral walls (29) into the closed position to compact cigarettes (3) inside said second seat (28).

11. The method of claim 10 wherein said first seat (60) comprises a further bottom wall (61) and two further lateral walls (62) crosswise to a further traveling direction (55) of said input wheel (7) and defining a cavity (63) for housing said group (2) with the cigarettes (3) crosswise to said further traveling direction (55), said further bottom wall (61) being defined by a pusher (61) movable, through said cavity (63), to and from an extracted position in which said further bottom wall (61) is located outside said cavity (63).

12. The method of claim 11 wherein said further lateral walls (62) are movable between a closed position, in which the further lateral walls (62) are substantially perpendicular to said further bottom wall (61) and separated from each other by a distance substantially equal to said distance, and a flared position.

13. A method of feeding a group of cigarettes to a wrapping line operated continuously of a cigarette packing machine, the method comprising a transfer step to transfer the group (2) from a pocket (14) integral with a conveyor (5) to a first seat (60) carried by an input wheel (7) of the wrapping line (4) and movable with respect to the input wheel (7), said transfer step comprising:

continuously feeding said group (2) along a given endless path (P) by means of the pocket (14) carried by the conveyor (5);

continuously feeding a second seat (28) carried by an intermediate wheel (6) along a portion of said path (P) in time with said pocket (14), the second seat (28) being movable with respect to the intermediate wheel (6);

axially transferring the group (2) from the pocket (14) to the second seat (28);

feeding the first seat (60) through an input station (73) of said wrapping line (4) by continuously rotating the input wheel (7) about a respective first axis (54a);

feeding the second seat (28) through the input station (73) in time with the first seat (60) by rotating the intermediate wheel (6) about a respective second axis (11) parallel to the first axis (54a);

orienting at least one of the first and second seats (60, 28) with respect to the respective wheel (7, 6), so that one of the first and second seats (60, 28) penetrates the other for a given time at the input station (73);

transferring the group (2) from the second seat (28) to the first seat (60) when one of the first and second seats (60, 28) penetrates the other at the input station (73); and supplying a collar (74) to the first seat (60) upstream from the input station (73), in order to apply the collar (74) to the group (2) when the group is transferred from the second seat (28) to the first seat (60).

14. The method of claim 13 wherein said conveyor (5) comprises a flexible member (12) extending along said path (P), which comprises a substantially circular portion (T) extending about said second axis (11), said intermediate wheel (6) being rotated about said second axis (11) at an angular speed equal to that of said flexible member (12) along said circular portion (T), and being substantially tangent to said input wheel (7) at said input station (73).

15. The method of claim 13 comprising a further step of applying an inner sheet of wrapping material (44) to the group (2) upstream from the input station (73), said inner sheet of wrapping material (44) being applied to the second seat (28) upstream from the input station (73).

16. The method of claim 15 wherein said inner sheet of wrapping material (44) is applied to said second seat (28) by gripping the inner sheet of wrapping material (44) by means of a gripping member (48) associated with said second seat (28).

17. The method of claim 16 wherein said gripping member (48) is moved with respect to said second seat (28) and with respect to said intermediate wheel (6) to position said inner sheet of wrapping material (44) correctly with respect to said second seat (28).

18. The method of claim 17 further comprising folding the inner sheet of wrapping material (44) upstream from said input station (73) in order to impart to the inner sheet of wrapping material (44) an L-shaped configuration about said second seat (28).

19. The method of claim 13 further comprising supplying a collar (74) to the first seat (60) upstream from the input station (73), in order to apply the collar (74) to the group (2) when the group is transferred from the second seat (28) to the first seat (60).

20. The method of claim 13 comprising a further step of compacting the cigarettes (3) in said group (2), said compacting step being performed during axial transfer of the group (2) from said pocket (14) to said second seat (28).

21. The method of claim 13 wherein said second seat (28) comprises a bottom wall (27) and two lateral walls (29) crosswise to a traveling direction (10) of the intermediate wheel (6) to house a said group (2) with the respective cigarettes (3) crosswise to said traveling direction (10), and in that said pocket (14) has a given width measured parallel to said path (P), said lateral walls (29) being moved between an open position, in which said lateral walls (29) are separated by a distance approximately equal to but no less than said given width, and a closed position, in which said distance is approximately equal to but no greater than said given width.

22. The method of claim 21 comprising a further step of compacting the cigarettes (3) in said group (2), said compacting step being performed by moving said lateral walls (29) into the closed position to compact cigarettes (3) inside said second seat (28).

23. The method of claim 22 wherein said first seat (60) comprises a further bottom wall (61) and two further lateral walls (62) crosswise to a further traveling direction (55) of said input wheel (7) and defining a cavity (63) for housing a said group (2) with the cigarettes (3) crosswise to said further traveling direction (55); said further bottom wall (61) being defined by a pusher (61) movable, through said cavity (63), to and from an extracted position in which said further bottom wall (61) is located outside said cavity (63).

24. The method of claim 23 wherein said further lateral walls (62) are movable between a closed position, in which the further lateral walls (62) are substantially perpendicular to said further bottom wall (61) and separated from each other by a distance substantially equal to said distance, and a flared position.

25. A method of feeding a group of cigarettes to a wrapping line operated continuously of a cigarette packing machine, the method comprising a transfer step to transfer the group (2) from a pocket (14) integral with a conveyor (5) to a first seat (60) carried by an input wheel (7) of the wrapping line (4) and movable with respect to the input wheel (7), said transfer step comprising:

continuously feeding said group (2) along a given endless path (P) by means of the pocket (14) carried by the conveyor (5);

continuously feeding a second seat (28) carried by an intermediate wheel (6) along a portion of said path (P) in time with said pocket (14), the second seat (28) being movable with respect to the intermediate wheel (6);

axially transferring the group (2) from the pocket (14) to the second seat (28);

feeding the first seat (60) through an input station (73) of said wrapping line (4) by continuously rotating the input wheel (7) about a respective first axis (54a);

feeding the second seat (28) through the input station (73) in time with the first seat (60) by rotating the intermediate wheel (6) about a respective second axis (11) parallel to the first axis (54a);

orienting at least one of the first and second seats (60, 28) with respect to the respective wheel (7, 6), so that one of the first and second seats (60, 28) penetrates the other for a given time at the input station (73);

transferring the group (2) from the second seat (28) to the first seat (60) when one of the first and second seats (60, 28) penetrates the other at the input station (73); and applying an inner sheet of wrapping material (44) to the group (2) upstream from the input station (73), said inner sheet of wrapping material (44) being applied to the second seat (28) upstream from the input station (73).

26. The method of claim 25 wherein said inner sheet of wrapping material (44) is applied to said second seat (28) by gripping the inner sheet of wrapping material (44) by means of a gripping member (48) associated with said second seat (28).

27. The method of claim 26 wherein said gripping member (48) is moved with respect to said second seat (28) and with respect to said intermediate wheel (6) to position said inner sheet of wrapping material (44) correctly with respect to said second seat (28).

28. The method of claim 27 further comprising folding the inner sheet of wrapping material (44) upstream from said input station (73) in order to impart to the inner sheet of wrapping material (44) an L-shaped configuration about said second seat (28).

29. The method of claim 25 comprising a further step of compacting the cigarettes (3) in said group (2), said compacting step being performed during axial transfer of the group (2) from said pocket (14) to said second seat (28).

30. The method of claim 25 wherein said second seat (28) comprises a bottom wall (27) and two lateral walls (29) crosswise to a traveling direction (10) of the intermediate wheel (6) to house a said group (2) with the respective cigarettes (3) crosswise to said traveling direction (10), and in that said pocket (14) has a given width measured parallel to said path (P), said lateral walls (29) being moved between an open position, in which said lateral walls (29) are separated by a distance approximately equal to but no less than said given width, and a closed position, in which said distance is approximately equal to but no greater than said given width.

31. The method of claim 30 comprising a further step of compacting the cigarettes (3) in said group (2), said compacting step being performed by moving said lateral walls (29) into the closed position to compact cigarettes (3) inside said second seat (28).

32. The method of claim 31 wherein said first seat (60) comprises a further bottom wall (61) and two further lateral walls (62) crosswise to a further traveling direction (55) of said input wheel (7) and defining a cavity (63) for housing a said group (2) with the cigarettes (3) crosswise to said further traveling direction (55), said further bottom wall (61) being defined by a pusher (61) movable, through said cavity (63), to and from an extracted position in which said further bottom wall (61) is located outside said cavity (63).

33. The method of claim 32 wherein said further lateral walls (62) are movable between a closed position, in which the further lateral walls (62) are substantially perpendicular to said further bottom wall (61) and separated from each other by a distance substantially equal to said distance, and a flared position.

* * * * *